(12) United States Patent
Olsen et al.

(10) Patent No.: US 12,306,592 B2
(45) Date of Patent: *May 20, 2025

(54) IMAGE CAPTURE TO PROVIDE ADVANCED FEATURES FOR CONFIGURATION OF A WEARABLE DEVICE

(71) Applicant: Apple Inc., Cupertino, CA (US)

(72) Inventors: Reed E. Olsen, San Jose, CA (US); Andreas E. Schobel, San Francisco, CA (US); Tyler D. Hawkins, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,792

(22) Filed: Sep. 21, 2022

(65) Prior Publication Data

US 2023/0013058 A1    Jan. 19, 2023

Related U.S. Application Data

(63) Continuation of application No. 16/905,643, filed on Jun. 18, 2020, now Pat. No. 11,493,890, which is a continuation of application No. 16/425,291, filed on May 29, 2019, now Pat. No. 10,782,651.

(60) Provisional application No. 62/679,928, filed on Jun. 3, 2018.

(51) Int. Cl.
| | |
|---|---|
| *G06F 3/048* | (2013.01) |
| *G04G 21/02* | (2010.01) |
| *G04G 21/04* | (2013.01) |
| *G04G 99/00* | (2010.01) |
| *G06F 3/14* | (2006.01) |
| *G06K 7/14* | (2006.01) |

(Continued)

(52) U.S. Cl.
CPC ............ *G04G 99/00* (2013.01); *G04G 21/02* (2013.01); *G04G 21/04* (2013.01); *G06F 3/14* (2013.01); *G06K 7/1417* (2013.01); *G06T 7/0002* (2013.01); *G06T 7/70* (2017.01); *G06T 2207/30196* (2013.01)

(58) Field of Classification Search
None
See application file for complete search history.

(56) References Cited

U.S. PATENT DOCUMENTS

| | | | |
|---|---|---|---|
| 10,019,654 B1* | 7/2018 | Pisoni | G06V 10/82 |
| 10,375,266 B2* | 8/2019 | Wexler | G06F 21/31 |
| 10,757,311 B2* | 8/2020 | Frank | H04N 23/90 |

(Continued)

FOREIGN PATENT DOCUMENTS

CN    105527834 A    4/2016

OTHER PUBLICATIONS

CN105527834 Machine Translation (Year: 2016).

*Primary Examiner* — Hua Lu
(74) *Attorney, Agent, or Firm* — Invoke

(57) ABSTRACT

In one embodiment, a method for providing enhanced configuration features includes receiving, by a computing device, indication that a wearable device has started a pairing process with a second electronic device and obtaining images corresponding to the wearable device. Moreover, the method includes analyzing, by the computing device, the images to determine one or more aspects of the wearable device and configuring the wearable device using the one or more aspects of the wearable device.

26 Claims, 7 Drawing Sheets

(51) Int. Cl.
*G06T 7/00* (2017.01)
*G06T 7/70* (2017.01)

(56) References Cited

U.S. PATENT DOCUMENTS

| | | | | |
|---|---|---|---|---|
| 2005/0276164 | A1* | 12/2005 | Amron | G04C 3/002 368/82 |
| 2013/0158984 | A1* | 6/2013 | Myslinski | G06Q 50/01 704/9 |
| 2014/0350353 | A1* | 11/2014 | Connor | G06V 40/28 600/301 |
| 2014/0361955 | A1* | 12/2014 | Goncalves | G06F 1/3215 345/8 |
| 2015/0022438 | A1* | 1/2015 | Hong | G06F 3/017 345/156 |
| 2015/0029826 | A1* | 1/2015 | Antognini | G04G 9/0064 368/10 |
| 2015/0049037 | A1* | 2/2015 | Vincent | G06F 3/014 345/173 |
| 2015/0063661 | A1* | 3/2015 | Lee | H04L 63/0861 382/124 |
| 2015/0085621 | A1* | 3/2015 | Hong | G04G 21/00 368/10 |
| 2015/0187142 | A1* | 7/2015 | Zhang | G06V 20/20 345/633 |
| 2015/0205994 | A1* | 7/2015 | Yoo | G06V 40/161 368/223 |
| 2015/0242015 | A1* | 8/2015 | Cho | G06F 3/04166 345/174 |
| 2015/0323998 | A1* | 11/2015 | Kudekar | G06F 1/163 345/156 |
| 2015/0338919 | A1* | 11/2015 | Weber | H04M 1/72454 345/156 |
| 2015/0362893 | A1* | 12/2015 | Masserot | G04G 5/00 368/4 |
| 2016/0037055 | A1* | 2/2016 | Waddington | H04N 23/62 348/211.8 |
| 2016/0054791 | A1* | 2/2016 | Mullins | G04G 21/04 345/173 |
| 2016/0085366 | A1* | 3/2016 | Chi | G06F 1/163 345/173 |
| 2016/0127624 | A1* | 5/2016 | Woo | G06F 3/011 348/36 |
| 2016/0182801 | A1* | 6/2016 | Luk | G06F 3/005 348/207.11 |
| 2016/0259299 | A1* | 9/2016 | Kahn | G04D 99/00 |
| 2016/0286630 | A1* | 9/2016 | Witzgall | F21S 8/033 |
| 2016/0299580 | A1* | 10/2016 | Ku | G06F 1/163 |
| 2016/0378176 | A1* | 12/2016 | Shiu | G06F 3/011 345/633 |
| 2017/0003765 | A1* | 1/2017 | Shedletsky | G06F 3/167 |
| 2017/0116657 | A1* | 4/2017 | Oh | G06Q 20/387 |
| 2017/0135635 | A1* | 5/2017 | Bostick | A61B 5/681 |
| 2017/0228029 | A1* | 8/2017 | Wexler | H04N 7/15 |
| 2017/0339137 | A1* | 11/2017 | Vanoni | H04N 23/56 |
| 2017/0358241 | A1* | 12/2017 | Wexler | G06V 40/10 |
| 2018/0091304 | A1* | 3/2018 | Brook | H04W 12/50 |
| 2018/0210555 | A1* | 7/2018 | Bostick | G06F 1/1694 |
| 2018/0217680 | A1* | 8/2018 | Sudou | G06F 3/017 |
| 2018/0307301 | A1* | 10/2018 | Lee | G03B 21/005 |
| 2018/0367944 | A1 | 12/2018 | Heo et al. | |
| 2019/0146219 | A1* | 5/2019 | Rodriguez, II | G06F 21/36 345/633 |
| 2019/0294300 | A1* | 9/2019 | Kline | G06F 3/0425 |
| 2019/0324538 | A1* | 10/2019 | Rihn | G06F 3/014 |
| 2020/0133203 | A1* | 4/2020 | Ando | G04B 27/02 |
| 2020/0379411 | A1* | 12/2020 | Watanabe | H04M 1/72412 |
| 2021/0311553 | A1* | 10/2021 | Keller | G06T 19/006 |

* cited by examiner

IMAGE CAPTURE TO PROVIDE ADVANCED FEATURES FOR CONFIGURATION OF A WEARABLE DEVICE

INCORPORATION BY REFERENCE; DISCLAIMER

Each of the following applications are hereby incorporated by reference: application Ser. No. 16/905,643 filed on Jun. 18, 2020; application Ser. No. 16/425,291 filed on May 29, 2019; application No. 62/679,928 filed on Jun. 3, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to electronic devices, and more specifically to providing configuration features for a wearable electronic device using images captured of the wearable device.

BACKGROUND

Wearable devices have become commonplace in today's society, with various formfactors being available for purchase, including wristwatches, glasses, rings, clothing, shoes, etc. Uses and functions of these wearable devices vary greatly, as each wearable device may be worn at a different part of the body and/or on clothing and accessories, may include more or less functionality, may have more or less advanced hardware, may include more or less intuitive interface(s), etc. The proliferation of these various wearable devices has resulted in many different versions of processes for establishing a connection between a wearable device and another electronic device. In order to initially establish this coupling, a pairing process is performed on the wearable device and/or on the other electronic device.

In particular, among wearable devices, a smartwatch may be electronically coupled with an external electronic device, such as a smartphone, via one or more wireless communication techniques, e.g., radio frequency (RF), optical or light transmission, etc. However, each pairing process typically requires extensive interaction and input from a user to properly set up the wearable device for the first time, so that it is able to access wireless network(s) and/or interact with the other electronic device for uploading data, downloading data, and generally transferring information.

Moreover, many wearable devices have a user account associated therewith that is specific to the user of the wearable device, and in order for the wearable device to communicate with the other electronic device, the device is initially paired to an online account and/or to the other electronic device. Typically, this involves authentication, and also identification or verification of the wearable device to be paired. Authentication includes verifying that the user is authorized to access the account to which data will be transmitted to/from the wearable device.

It is desirable to minimize the amount of user interaction and input required in the pairing process and configuration for ease of use and setup of the wearable device. This is particularly true of small form factor wearable devices which are intentionally configured to minimize the inclusion of external mechanical interface elements, such as buttons, displays, and keys.

SUMMARY

In some implementations, a method for providing enhanced configuration features includes receiving, by a computing device, indication that a wearable device has started a pairing process with a second electronic device and obtaining images corresponding to the wearable device. Moreover, the method includes analyzing, by the computing device, the images to determine one or more aspects of the wearable device and configuring the wearable device using the one or more aspects of the wearable device.

Particular implementations provide at least the following advantages. The user of the wearable device does not need to input various details about the wearable device into the second electronic device in the pairing process or during configuration of the wearable device, as these details are provided to the second electronic device as a result of analyzing the images, thereby providing an easier and more efficient pairing process. Moreover, aspects of the wearable device may further be used to configure the wearable device and to provide suggestions to the user as to how the wearable device may be better utilized based on analysis of the images.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
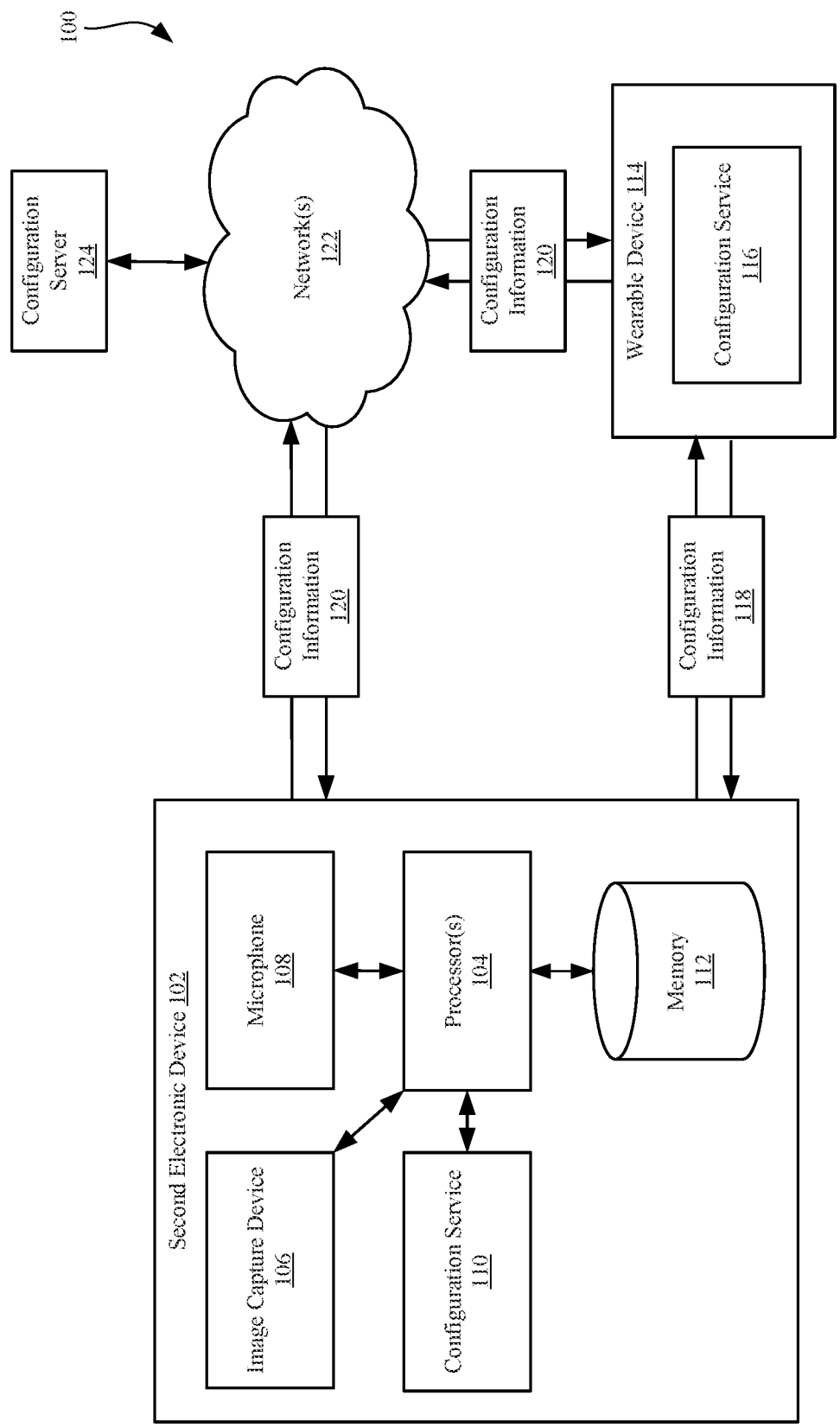
FIG. 1 is a simplified block diagram of an example system for providing advanced features for a pairing process of a wearable device.

FIG. 1 is a block diagram of an example system 100 for providing advanced features for a pairing process between a wearable device 114 and a second electronic device 102, possibly utilizing a network 122.

Figure 4:
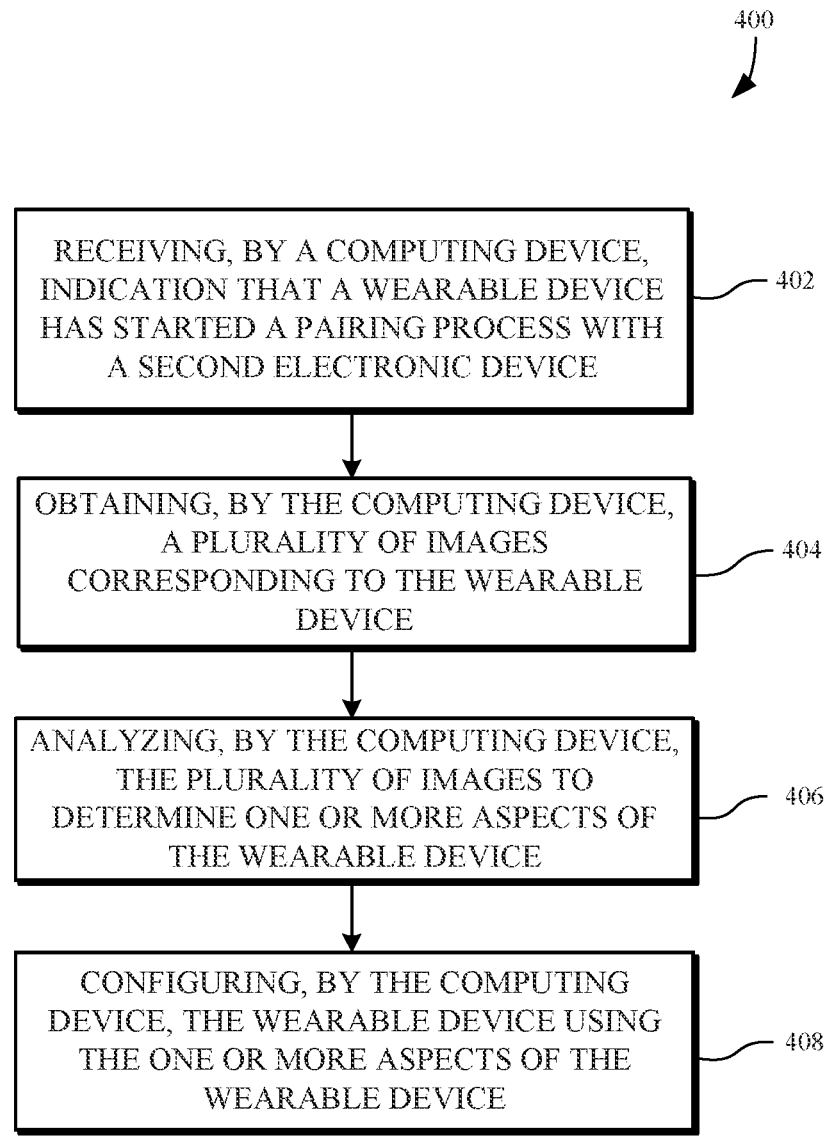
FIG. 4 is flow diagram of an example method for utilizing captured images to configure a wearable device.
Figure 5:
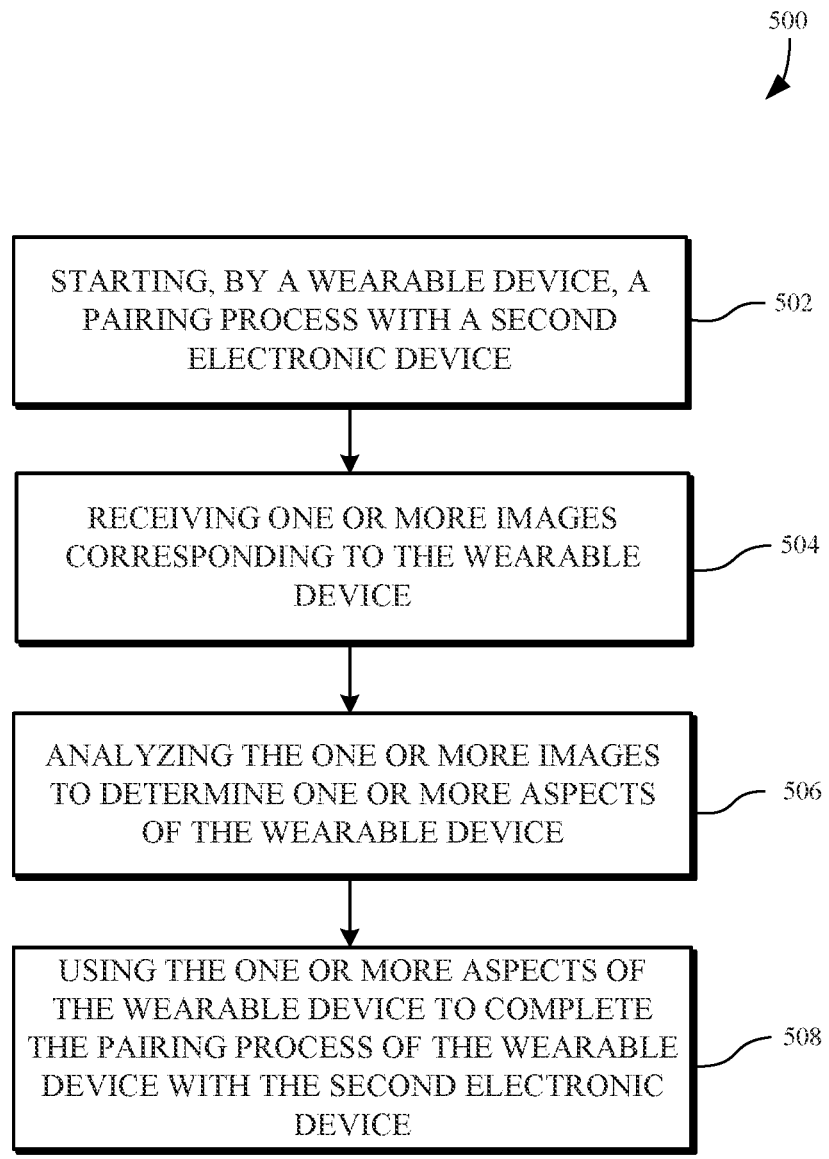
FIG. 5 is flow diagram of an example method for utilizing images captured for a paring process.
Figure 6:
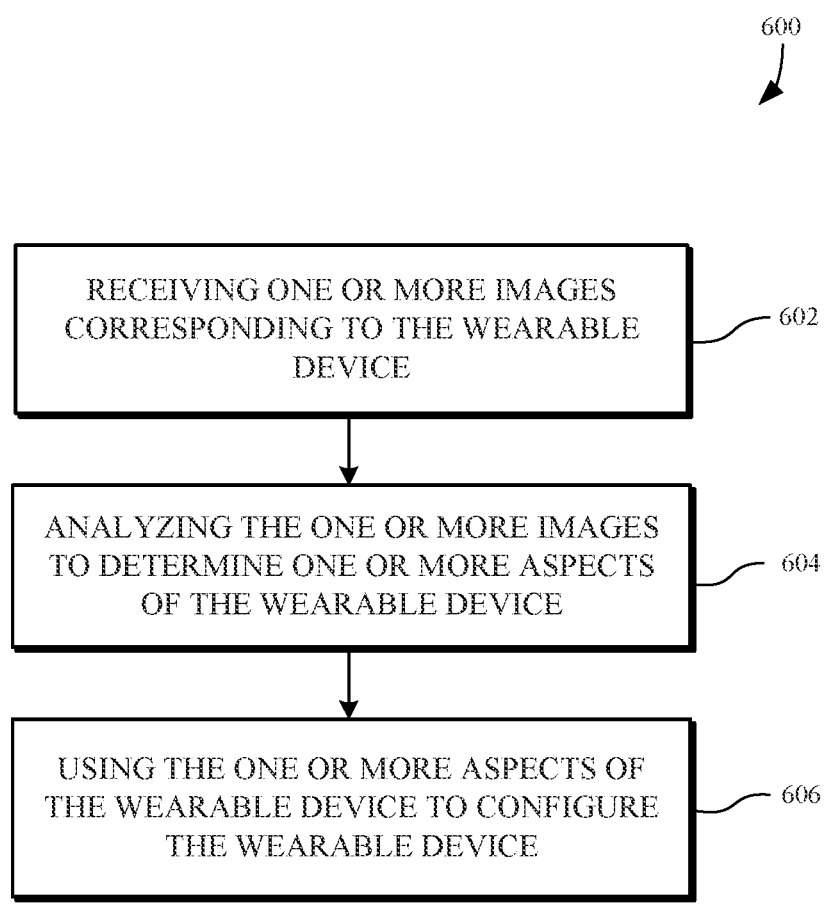
FIG. 6 is flow diagram of an example method for utilizing images captured for a paring process.

The wearable device 114 comprises a processor or multiple processors and logic and/or instructions configured to cause the processor(s) to perform operations, described in more detail in FIGS. 4-6. Referring again to FIG. 1, in one implementation, the wearable device 114 is an electronic device that is configured and designed to be worn by a user and/or on an article of clothing of a user, such as a shoe, a jacket, a shirt, underwear, etc. The wearable device 114 may be worn on a wrist of the user, around a neck of the user, on a finger of the user, on some other body part of the user, held by the user, and/or accessible by the user remotely from other electronic devices.

The wearable device 114 may be any type of wearable or portable device known in the art, such as a smartwatch, an activity and/or fitness tracker (including electronic trackers worn as a wristband, as a ring on a finger, in a shoe, on clothing, on a hat, etc.), virtual reality (VR) devices (such as VR headsets, VR goggles, VR glasses, etc.), augmented reality (AR) devices (such as AR headsets, AR goggles, AR glasses, etc.), a heart rate monitoring devices (e.g., a chest band, a wristband, etc.), wireless and/or Bluetooth headphones, wireless and/or Bluetooth earbuds, wireless and/or Bluetooth microphones, location indicating/tracking devices (e.g., global positioning satellite (GPS) devices, emergency beacons, satellite phones, etc.), an electronic wristband, etc.

The second electronic device 102 comprises a processor or processors and logic and/or instructions configured to cause the processor(s) to perform operations, described in more detail in FIGS. 4-6. Referring again to FIG. 1, in one implementation, the second electronic device 102 is an electronic device that is configured to perform functions in addition to interacting with the wearable device 114, at least in furtherance of a pairing process between the wearable device 114 and the second electronic device 102. The pairing process, once completed successfully, establishes a wireless electronic coupling between the second electronic device 102 and the wearable device 114 that provides a link for data and information transfer between the second electronic device 102 and the wearable device 114.

The second electronic device 102 may be any type of electronic device known in the art, including portable electronics (e.g., a smartphone, a laptop or notebook computer, a tablet computing device, a digital camera, a video recorder, etc.) and electronic devices intended to remain static (e.g., a desktop computing device, home media and entertainment devices, gaming consoles, physical media players (e.g., Blu-Ray, DVD, etc.) streaming devices, smart TVs, etc.).

As shown in FIG. 1, according to one implementation, the second electronic device 102 includes a processor 104 or multiple processors electrically coupled to a configuration service 110, an image capture device 106, and a memory 112. The processor(s) 104 may also be electrically coupled to a microphone 108 in one implementation.

The processor(s) 104 may include any type of processor known in the art. A portion of the memory 112 may be removable from the second electronic device 102, while a different portion of the memory 112 may be permanently integrated into the second electronic device 102 in an implementation. In some implementations, the memory 112 may comprise any type of memory and/or storage technologies known in the art.

The image capture device 106 is configured to obtain an image of real world objects and/or actions, and provide the image to the processor(s) 104 for analysis thereof, as described in more detail in FIGS. 4-6. Referring again to FIG. 1, the image capture device 106 may provide a still image, a set of still images, and/or a video that includes multiple images. The image capture device 106 may comprise a digital camera and/or a digital video recorder, and may be complimented by a flash or other light source for providing additional or different types of light to an object being photographed and/or recorded. The image capture device 106 provides the image(s) and/or video(s) in a format known in the art and recognizable by the processor(s) 104, such as .jpg, .png, .tiff, .bmp, .sgi, .rgb, .mpeg, .avi, Quick-Time, etc.

The microphone 108, when included in the second electronic device 102, is configured to provide audio content to the processor(s) 104. The audio content may be captured from a user of the second electronic device 102, particularly in furtherance of a pairing process between the second electronic device 102 and the wearable device 114. Some example audio content includes, but is not limited to, instructions from the user to begin, end, and/or proceed to a next step of the pairing process, an answer by the user to a query generated during the pairing process to provide necessary information for the pairing process, ambient noise present during the pairing process, specific cues and/or signals generated by the wearable device during the pairing process, etc.

In one approach, one or more sensors of the second electronic device 102 may gather information about the second electronic device 102 and/or the wearable device 114. Some example sensors include a temperature monitor configured to obtain temperature readings of an object and/or a surrounding environment (e.g., air), an infrared (IR) camera or sensor configured to capture IR images of an object or surroundings, a heartrate (HR) monitor configured to obtain a heartrate of user, a motion sensor configured to capture movement of the second electronic device 102, etc.

According to an approach, one or more sensors of the wearable device 114 may gather information about the wearable device 114. Any of the previously described sensors may be included with the wearable device 114, along with other sensors known in the art. The sensor information obtained from sensor(s) of the second electronic device 102 and/or the wearable device 114 may be used alone or in conjunction with information obtained from the image(s) and/or video(s) provided by the image capture device 106.

The configuration service 110, in one implementation, provides instructions and logic for configuring the wearable device 114 in response to receiving the image(s) and/or video(s) from the image capture device 106. This process is described in more detail in FIGS. 4-6. In addition, with reference to FIG. 1, the second electronic device 102 may be provided without the configuration service 110 in implementations where the wearable device 114 is configured to configure itself (via the configuration service 116 thereon) without the aid of the second electronic device 102, except for the provision of the captured image(s) and/or video(s).

The processor(s) 104 and/or the configuration service 110, when implemented on the second electronic device 102, may analyze the image(s) and/or video(s) received from the image capture device 106 to determine aspects of the wearable device 114, as described in more detail in FIGS. 4-6.

Moreover, referring again to FIG. 1, the second electronic device 102 is configured to send and/or receive configuration information 120 to and/or from the wearable device 114 in one implementation. In an implementation, a network 122 may be utilized for transmitting configuration information 120 to the wearable device 114, as would be understood by one of skill in the art. Any type of network known in the art, including proprietary networks and transmission protocols, may be used for the network 122.

In one implementation, a configuration server 124 may be electrically coupled to the network 122, and this configuration server 124 may provide configuration services for the wearable device 114, particularly in relation to a pairing process between the wearable device 114 and the second electronic device 102.

According to an implementation, the second electronic device 102 may provide the configuration information 118 directly to the wearable device 114, via an electrical link therebetween.

The wearable device 114 may include, in some implementations, a configuration service 116 for analyzing the image(s) and/or video(s) received in the configuration information 118 from the second electronic device 102 (and/or the configuration information 120 received via the network 122) to determine aspects of the wearable device 114, as described in more detail in FIGS. 4-6.

With reference to FIG. 1, the configuration information 118 and/or 120 may include any information that would be helpful for completing a pairing process between the wearable device 114 and the second electronic device 102 and/or information that would enable the wearable device 114 to perform better or with less input from the user, such as a network and/or media access control (MAC) address of an electrical device, a name of an electrical device, a serial number and/or another unique identifier of an electrical device, an image captured by the second electronic device 102 of the wearable device 114, an image captured by the second electronic device 102 of conditions in which the wearable device 114 is being utilized and/or worn, a video captured by the second electronic device 102 of the wearable device 114, a video captured by the second electronic device 102 of conditions in which the wearable device 114 is being utilized and/or worn, an image of a graphical code that represents configuration information of the wearable device, etc.

The configuration information 118 and/or 120 may be used to configure the wearable device 114, at least initially, with little or no input from the user being utilized in the configuration. This configuration may be possible by providing information about the wearable device 114, such as model, type, size, description, operating system, setup requirements, position of the wearable device 114 on the body of the user, orientation of the wearable device 114 relative to other landmark features such as a body part of the user (e.g., face, wrist, hand, leg, neck, eyes, etc.), clothing, accessories, etc., obtained via analysis of the image(s) and/or video(s).

In one implementation, analysis of the image(s) and/or video(s) may include detection of a particular graphical code, pattern, signal, etc., of a type known in the art, that is presented on a display of the wearable device 114 during the pairing process, such as a bar code, two-dimensional code, quick response (QR) code, decryptable image, etc.

This graphical code may have information embedded therein that is extractable during the analysis, with the information being useful for configuration of the wearable device 114, as described in more detail herein.

Figure 2:
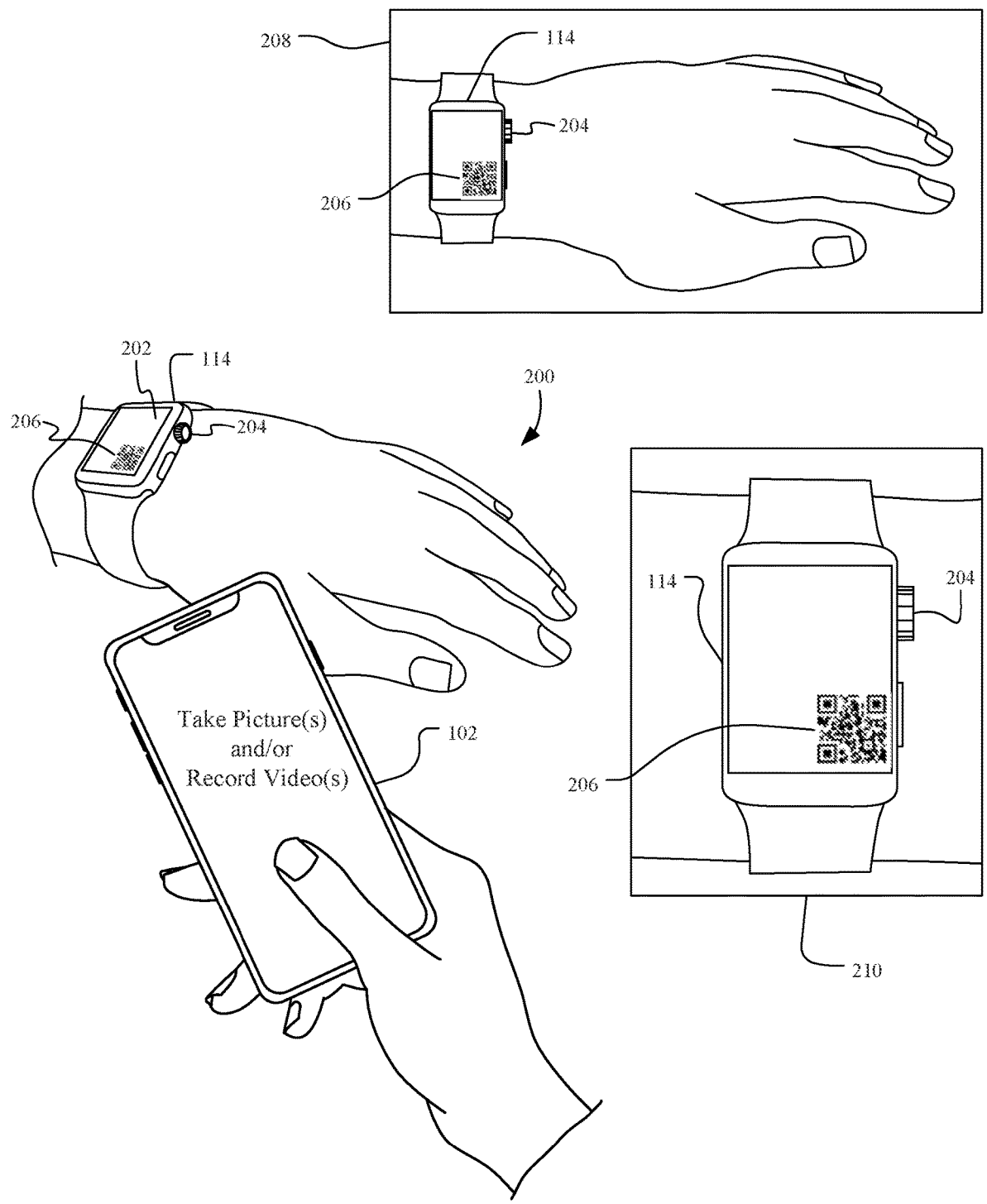
FIG. 2 is a simplified diagram of an example electronic device capturing image(s) of an example wearable device.

As shown in FIG. 2, a process 200 for capturing image(s) and/or video(s) of a wearable device 114 is shown in one implementation. A second electronic device 102 (shown as a smartphone, but not so limited) may be used to capture the image(s) and/or video(s) of the wearable device 114 (shown as an smartwatch, but not so limited) that may be used to provide enhanced configuration features that may be triggered in a pairing process (such as pairing the wearable device 114 to the second electronic device 102). These image(s) and/or video(s) may be sent to the wearable device 114 (and/or a configuration server that provides remote configuration service for the wearable device 114) to be analyzed to provide information useful in configuring the wearable device 114 in the pairing process with the second electronic device 102 and after the pairing process.

Moreover, a graphical code 206 may be output to a display 202 of the wearable device 114 in anticipation of the image(s) and/or video(s) being captured, and the second electronic device 102 may capture an image and/or video of the wearable device 114 displaying the graphical code 206, thereby allowing the graphical code 206 to be analyzed in addition to the image(s) and/or video(s). The graphical code 206 may include indications of aspects of the wearable device 114, characteristics of the user of the wearable device 114, an environment in which the wearable device is being used, a relationship or conditions of the wearable device 114 and the user thereof, etc., that are represented in a manner understandable by a configuration service upon analyzing the graphical code 206. During the analysis of the image(s) and/or video(s), upon detection of such a graphical code 206, the configuration service will determine the aspects of the wearable device 114 (and any other useful information) that have been indicated by the graphical code 206.

In addition, more than one image and/or video may be captured of the wearable device 114 from more than one angle that may show more or less detail of surrounding features in addition to the wearable device 114 itself. Some example information that may be obtained from multiple images and/or video include depth information that further describes distances between objects shown, infrared (IR) image information, heat/temperature information, etc. Image 208 shows a left hand of the user with the wearable device 114 being attached to a left wrist, with the wearable device 114 having a physical input element 204 (the physical input element 204 is a crown as known in the field of watches in FIG. 2, but not so limited) on a right side thereof and displaying a graphical code 206. Image 210 shows a close-up view of a front view of the wearable device 114, but little detail about the user or other surrounding details is present in image 210. However, even more clearly visible in image 210 is the physical input element 204 positioned on the right side of the wearable device 114, and the graphical code 206 displayed by the wearable device 114, which allows for accurate analysis of the graphical code 206 and determination of a physical orientation of the physical input element 204.

A wearable device 114 may include any number of physical input elements 204, such as a crown, a button (as shown below the crown in images 208 and 210), a toggle, a switch, a dial, etc. The physical orientation of each of these physical input elements 204 may be captured in the image(s) and/or video(s), thereby allowing for determination of an orientation of the wearable device 114 based on a predefined understanding of the physical layout of the wearable device 114.

Also, any number of graphical codes 206 (including the absence of a code being displayed on the wearable device 114) may be displayed simultaneously, randomly, or in a predetermined sequence on the display 202 of the wearable device 114. In this implementation, each graphical code 206 may be configured to provide different, but possibly overlapping, information about the wearable device 114, an environment in which the wearable device 114 is being used, a user, etc. Upon detection of each graphical code 206 of the series of codes, the configuration service may determine and assemble portions information about the wearable device 114 into a collection of configuration information that is provided by the various graphical codes 206.

In an implementation, a moving graphical code 206 may be provided to a display of the wearable device 114, in which a video may be used to capture the movements and/or changes that the graphical code 206 undergoes over a certain amount of time (with the movements and/or changes repeating after the amount of time) or a series of still images may be captured to obtain each the condition of the moving graphical code 206 after each movement thereof. These movements and/or changes may be used to indicate different portions of the configuration information, that is available to be determined from the video and/or images that captures the movements and/or changes, as would be understood by one of skill in the art upon reading the present descriptions.

According to one implementation, a graphical code 206 may be segmented into two or more discrete portions, with each portion representing a different aspect of the wearable device 114, a user of the wearable device 114, and/or context between the user and the wearable device 114. Each of these segments of the graphical code 206 may be analyzed separately to determine the discrete information provided by the individual segment. For example, a QR code may be split into four portions, with a first portion representing aspects of the user, a second portion indicating aspects of the wearable device 114, a third portion representing an orientation of the wearable device 114 in relation to the user, and a fourth portion representing identifying information for the various devices. Of course, any segmentation may be provided in the graphical code 206 as would be understood by one of skill in the art upon reading the present descriptions.

In an implementation, the graphical code 206 may be an optical label. The optical label may be a machine readable code, a one or two dimensional information symbol, a data matrix code, etc. In accordance with one implementation, the optical label may be color coded and output on a display of the wearable device 114 in such a way that the optical label is not perceptible to a user when displayed. More specifically, when the optical label is output on the display of the wearable device 114, the optical label may be color encoded. In one example, the optical label may be displayed in alternating frames, with different colors being encoded in each frame.

In capturing more than the wearable device 114 itself in the image(s) and/or video(s), additional information may be determined from the image(s) and/or video(s), such as a body part of the user, lightness and/or darkness of the surroundings, characteristics of the user (skin tone, presence of prosthetic(s), left or right hand, arm, or leg wearing the wearable device 114, etc.). Some or all of this additional information may be included in the aspects of the wearable device 114 as configuration information.

Moreover, the presence of the wearable device 114 on a designated body part of the user or off the designated body part (e.g., a watch is intended to be worn on a wrist, not an ankle, neck, or held in the hand, etc.) may be used to enable and/or disable certain features of the wearable device 114 in response to detection of the presence of the wearable device 114 in a proper or improper context. For example, some devices provide unlocking services for itself and/or other paired or recognized devices in response to a wearable device being worn. Therefore, in response to detection that the wearable device 114 is not being worn by the user after analyzing the image(s) and/or video(s), such functionality may be disabled for the wearable device 114 and any other devices seeking permission to remain unlocked until such time that the wearable device 114 is being worn.

According to one implementation, some devices unlock and/or authorize certain sensitive features (such as payment features, setup services, personal information disclosure, etc.) without requiring determination of the identity of the user in response to the user unlocking the wearable device initially and the wearable device being constantly worn by the user. In this case, the user will not be required to re-enter credential information to unlock the features each time they are accessed when the wearable device has constantly been worn since being unlocked initially. For such functionality to be enabled, the user will be prompted to enable the functionality prior to the sensitive features being unlocked automatically based on the wearable device being constantly worn by the user.

In an implementation, the captured image(s) and/or video(s) may be displayed to the user, such as on a display of the wearable device 114, a display of the second electronic device 102, etc., prior to being analyzed, to provide the user an opportunity to review the image(s) and/or video(s) to determine whether a good likeness of the wearable device 114 and/or surroundings thereof have been captured. A result of this review may lead to the image(s) and/or video(s) being analyzed, or additional images and/or videos being requested and subsequently captured using the second electronic device 102.

Any suitable GUI may be used on the second electronic device 102 to facilitate the capturing of the image(s) and/or video(s) as would be understood by one of skill in the art upon reading the present descriptions. For example, the GUI may prompt the user to take image(s) and/or video(s) of the wearable device 114 from a predetermined set of angles, then analyze the captured image and/or video to determine whether the requested operation was performed. When the requested operation is performed, a next prompt may be presented for an operation to be performed (e.g., an image or video from a different angle, of a different portion of the wearable device 114, etc.). After a sufficient number of images and/or videos have been captured, the second electronic device 102 may send the image(s) and/or video(s) as configuration information to the wearable device 114 and the GUI may indicate completion of this part of the pairing process.

In addition, any suitable GUI may be used on the wearable device 114 to facilitate the capturing of the image(s) and/or video(s) as would be understood by one of skill in the art upon reading the present descriptions. For example, the GUI may display the graphical code(s) 206 and prompt the user to indicate when a code from the series has been captured, or display the series of codes or moving code in a repeating loop. In one implementation, no specific GUI for the pairing process may be displayed on the wearable device 114, in which a majority of the configuration activity is performed by the second electronic device 102 and/or a configuration server remote from the wearable device 114.

Figure 3:
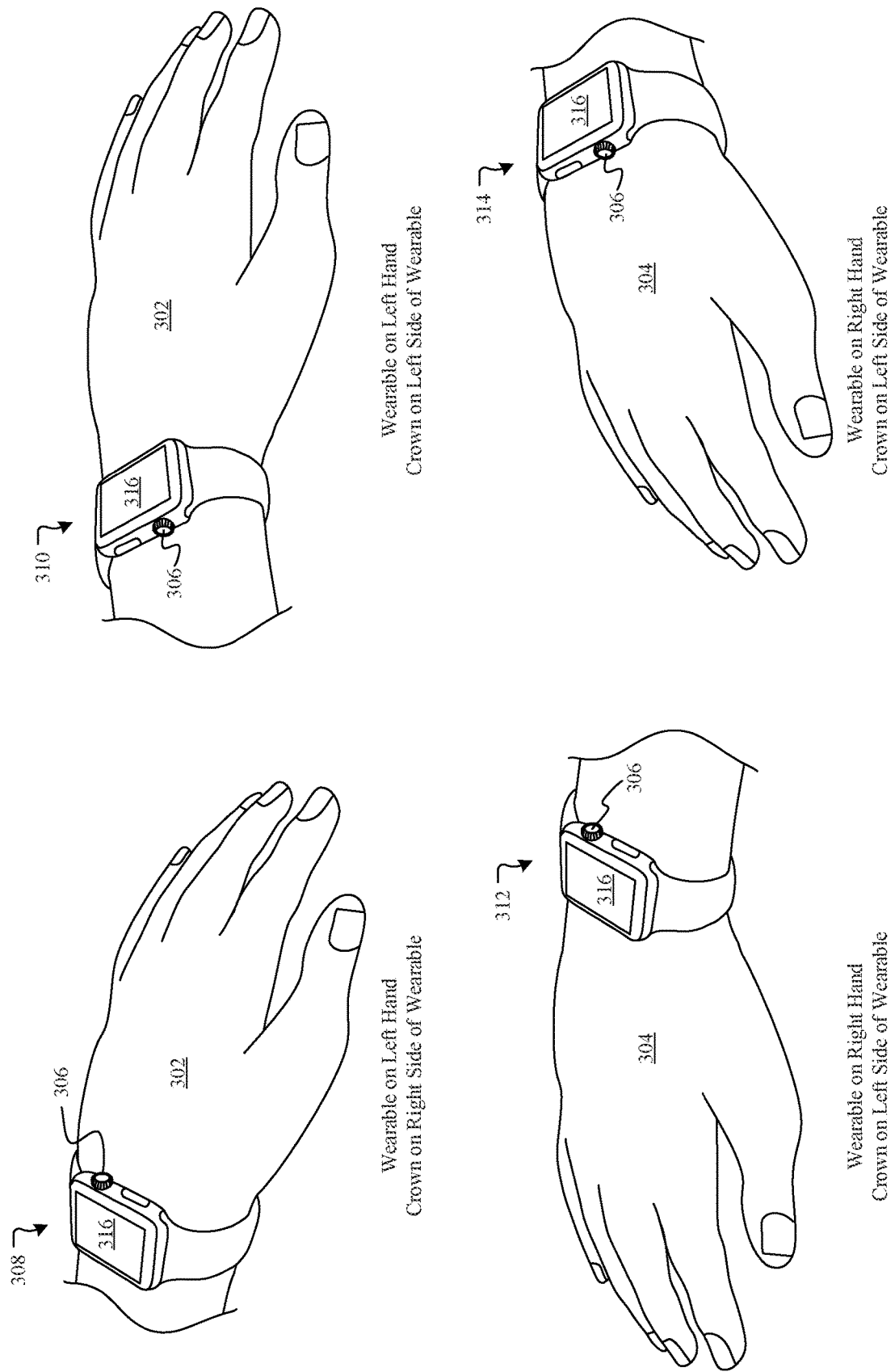
FIG. 3 shows four example orientations for a particular wearable device, in one implementation.

Now referring to FIG. 3, four orientations of a wrist-worn wearable device (e.g., a smartwatch) 316 are shown in various implementations. In each orientation, a position of a physical input element (e.g., a crown) 306 on the smartwatch 316 and a left or right hand (or wrist depending on how it is described) on which the smartwatch 316 is being worn are used as descriptions for the particular orientation. In orientation 308, the smartwatch 316 is worn on the left hand 302 with the crown 306 being positioned on a right side of the smartwatch 316, which may be indicated as "LR." In orientation 310, the smartwatch 316 is worn on the left hand 302 with the crown 306 being positioned on a left side of the smartwatch 316, which may be indicated as "LL." In orientation 312, the smartwatch 316 is worn on the right hand 304 with the crown 306 being positioned on a right side of the smartwatch 316, which may be indicated as "RR." In orientation 314, the smartwatch 316 is worn on the right hand 304 with the crown 306 being positioned on a left side of the smartwatch 316, which may be indicated as "RL."

The configuration information may include details about one of these orientations that are determined from the image(s) and/or video(s) captured for analysis in the pairing process. Of course, any other type of wearable device known in the art may have similar orientations specific to the particular wearable, and these specific orientations may be determined from the image(s) and/or video(s) used in determining the configuration information for the particular wearable in the pairing process, so that an orientation of the wearable is known for configuration of the wearable device in the pairing process.

In one implementation, a wearable device, e.g., the smartwatch 316 as shown in FIG. 3, may be held by the user rather than being coupled to an appropriate body part, clothing item, etc., e.g., the wrist for a smartwatch 316. In one such implementation, the smartwatch 316 may be held in the user's palm or hand. However, even while being uncoupled from the user and/or positioned at an unusual location on the user's body (e.g., not the wrist), the orientation of the smartwatch 316 with respect to the user may be determined, along with the orientation of any physical input elements thereof, such as the crown 306, with respect to the smartwatch 316.

Further, upon detection that the smartwatch 316 is positioned unusually based on a first image, the user may be alerted or prompted to properly orient and/or position the smartwatch 316 on a wrist, and then to capture a second image of the smartwatch 316 after it is repositioned, so that the second image depicts how the smartwatch 316 will be operated by the user.

This type of alert system may be implemented with any wearable device with the knowledge of where the wearable device is typically positioned in order to be utilized by a user. After analyzing a first image that shows that the wearable device as depicted in the first image deviates from the typical position, the user may be alerted as to where a more appropriate position exists for the wearable device, and the user may be further implored to position the wearable device in accordance with this information and then to capture a second image to verify that the wearable device has been repositioned properly.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

FIG. 4 is flow diagram of an example method 400 for utilizing captured images to configure a wearable device. For example, method 400 may be performed by a wearable device 114, a second electronic device 102, a configuration server 124, or some combination thereof, as described in FIG. 1. Moreover, in the descriptions of FIG. 4, the computing device may be any suitable computing device known in the art, such as a wearable device, a second electronic device separate from the wearable device, a configuration server remote from the wearable device and the second electronic device, etc.

In step 402, indication that a wearable device has started a pairing process with a second electronic device is received. In one implementation, the indication may be in the form of an electronic message, alert, request, notice, communication, or some other known type of electronic correspondence, sent from an electronic device, such as the second electronic device and/or the wearable device.

In an implementation, the indication may be determined by monitoring actions and/or communications to/from the wearable device and/or the second electronic device, in which case activity that is indicative of a pairing process being started may be determined.

In one approach, a pairing process is not needed prior to obtaining images of the wearable device, as any triggering event may be used to cause the images to be obtained so that configuration information may be determined from the images. In one approach, a triggering event may be a request from the user to start the configuration In one example, no triggering event is required before the images are obtained.

At step 404, images corresponding to the wearable device are obtained. The images may be in the form of pictures, video, or some other suitable image format known in the art that is capable of being analyzed for determining content thereof.

In one implementation, the images are captured by the second electronic device using a camera and/or video recorder thereof. Moreover, a light source may be utilized to enhance the wearable device and/or to reveal a particular aspect of the wearable device not recognizable without use of the light source, such as IR reactive text or images on a display or exterior of the wearable device, black light reactive text or images on a display or exterior of the wearable device, etc.

In step 406, the images are analyzed to determine aspects of the wearable device. This analysis may be performed by a machine learning module or a group of machine learning modules, which may be present on the wearable device, on the second electronic device, and/or on the configuration server. The analysis may utilize any image manipulation and detection techniques known in the art, including but not limited to, pattern recognition, digital geometric analysis, signal processing, image segmentation, motion detection, video tracking, optical flow analysis, object-based image analysis, etc.

The aspects that are determined from the images may represent any characteristic, condition, form, trait, capability, feature, and/or attribute of the wearable device, surroundings of the wearable device, and/or a user of the wearable device as captured in the images.

In one example, the aspects of the wearable device may include, but are not limited to, a manufacturer and model of the wearable device, a size of the wearable device, a tightness of a band of the wearable device on a body part of a user, a position of the wearable device on the user, an orientation of the wearable device with respect to itself and the user, a material of the wearable device, a material of the band of the wearable device, a color of the wearable device, a color of the band of the wearable device, a graphical code displayed on the wearable device, etc.

In an implementation, the aspects of the wearable device may include an orientation of a physical input element of the wearable device with respect to a body of the wearable device, e.g., where a crown or button is positioned with respect to a display of the wearable device and on which side of the wearable device the crown or button is positioned (left or right side). The orientation of the physical input element may be used to determine how input received from the physical input element is transformed into an operation by the wearable device.

For example, a crown which spins clockwise and counter-clockwise may cause displayed information to scroll up or down (a scrolling direction), depending on which direction the crown is rotated. From the point of view of the user, rotation in one direction may be anticipated to cause scrolling up, but the orientation of the wearable device (on which side the crown is located) may cause an action that is reversed to this perception, and the displayed information may scroll down as a result of the rotational input. Therefore, the wearable device is configured to cause a toggle and/or scrolling direction (which direction to move content on a display of the wearable device) for display to respond in an anticipated way to rotational input (e.g., when the crown is on the right side, clockwise scrolls up and counter-clockwise scrolls down; when the crown is on the left side, clockwise scrolls down and counter-clockwise scrolls up in response to activation of the crown. Of course, these directions and rotational inputs are for example, and other combinations are possible based on a user's desire and default settings of the wearable device.

In one implementation, the image(s) corresponding to the wearable device include an image of the wearable device positioned on a body part of a user, such as a hand or wrist of the user for a watch or wristband, a finger of the user for a fitness tracking ring, a face of the user for AR/VR glasses or goggles, etc.

In an example, a physical orientation of the wearable device with respect to a body part of the user on which the wearable device is coupled to the user may be determined by analysis of the images, e.g., which wrist a watch is being worn on and an orientation of the watch with respect to the hand of the user, e.g., LL, LR, RL, RR, which finger a ring is being worn on, how tightly a watchband is closed around a wrist, where on the wrist the watch is being worn (adjacent to the hand, farther from the hand behind the wrist bone, etc.), how tightly a chest strap is closed around a user's chest, etc.

At step 408, the wearable device is configured using the aspects of the wearable device. This configuration may take place in addition to or as part of the pairing process.

In one implementation, the wearable device is a smartwatch and the body part is a wrist or hand of the user. In this implementation, the aspects of the wearable device include a determination of which wrist of the user the smartwatch is being worn on, a determination of whether the smartwatch is positioned on an inside or an outside of the wrist of the user (the inside of the wrist is closest to the palm of the hand, with the outside being opposite the inside), and a determination of an orientation of a crown of the smartwatch, e.g., RL, LR, RR, LL.

The aspects may be used to configure how navigational directions are provided by the wearable device based on an orientation of the wearable device on a body of the user, how motion is indicated by the wearable device based on an orientation of the wearable device with respect to the user's viewing angle (up versus down, left versus right, etc.), how the wearable device is indicated on a display of the wearable device (color, size, model, etc.), etc.

For example, for a smartwatch positioned on a left wrist of the user, a forward indicated navigational cue may appear as an up arrow on the display of the wearable device when the elbow is bent about 90° for viewing of the display of the smartwatch. Moreover, a right navigational cue may appear as an arrow pointing toward the left hand of the user and a left navigational cue may appear as an arrow pointing up the left arm of the user.

In contrast, for a smartwatch worn on the right hand of the user, the navigational cues may be adjusted to account for the placement and orientation of the smartwatch. For example, should the face of the watch be flipped 180° in comparison with how it was worn on the left hand, then a forward navigational cue arrow may also be flipped, since displaying the arrow as configured for left-hand wearing would result in the arrow pointing back at the user, not forward away from the user. Moreover, the left and right navigational cues may also be configured to be reversed as a result of the smartwatch being worn on the right hand of the user instead of the left hand (and the watch face flipped 180°).

In an implementation, the aspects of the wearable device that are determined as a result of the analysis are each assigned a confidence score subsequent to determination of the aspects of the wearable device. These confidence scores may be based on any known algorithms and/or methodologies for creation of and usage of confidence scores as are known in the art.

Moreover, after calculation of the confidence scores for each aspect, a request to confirm a first aspect may be displayed to the computing device in response to a corresponding confidence score assigned to the first aspect being less than a predetermined threshold, e.g., 50%, 60%, 75%, 80%, etc. Thereafter, the wearable device is configured in accordance with the first aspect in response to receiving confirmation of the first aspect indicated by the request.

In an implementation, the wearable device is configured in accordance with a second aspect in response to a determination that a corresponding confidence score assigned to the second aspect is at least equal to the predetermined threshold, e.g., 50%, 60%, 75%, 80%, etc., without utilizing a request to confirm the second aspect.

Further, one aspect that is determined about the wearable device that is in conflict with another aspect (e.g., both aspects are not possible to exist at the same time) are refined based on their corresponding confidence scores to narrow down the results for the user. For example, if the analysis determines there is a 20% confidence that the wearable device is positioned on a right hand, and a 80% confidence that the wearable is positioned on a left hand, only the aspect that indicates that the wearable device is positioned on the left hand is provided to the configuration service for configuring the wearable device.

Moreover, for undetermined aspects, e.g., 50/50 confidence scores or no majority results from multiple conflicting aspects, e.g., 33/33/33 confidence scores for conflicting aspects, a request to choose which aspect is correct may be presented to the user, on a display of one of the devices. Upon selection of which aspect is correct, this selected aspect will be provided for configuration of the wearable device.

The method 400 may also include determining that the physical orientation of the wearable device is not optimized for the user based on the aspects resulting from the analysis. Thereafter, the user may be alerted to the non-optimized physical orientation of the wearable device, such as via an indication being displayed on one of the devices, an audible alert or audio file being output by one of the devices, haptic feedback that provides vibrational output to the user, etc. When possible, a notification is provided with an alert that describes a correction to the physical orientation of the wearable device for the user to implement.

For example, if it is determined that a wristband is being worn too loosely to properly detect health data, such as a heartrate, glucose, etc., of the user, a message may be displayed on the wristband indicating to tighten the wristband. In a further approach, the user may be asked to capture a follow-up image after adjusting the wearable device to review the changes and ensure that the positioning and coupling to the user is adjusted properly. If not, follow-up instructions may be presented to the user via any electronic device available.

In an example, if a watch is being worn too high on the wrist of the user (too far away from the hand), the user may be alerted to the condition, such as by displaying a message on the second electronic device during the pairing process or thereafter, to move the watch closer to the hand to provide better contact with the user's wrist for certain sensors of the watch, such as a heartrate monitor, an electrocardiogram (EKG or ECG) sensor, a temperature sensor, etc.

In one implementation, in response to detection of an object near to the wearable device that may obstruct normal or optimal performance of the wearable device and/or sensors of the wearable device, the user may be alerted to correct, minimize, or remove the obstruction. This alert may be provided visually, audibly, and/or haptically via the wearable device, the second electronic device, or a suitable device.

For example, a bracelet for a smartwatch may be an obstruction because it may slide between the smartwatch and the wrist of the user and reduce or obstruct a heartrate monitor from determining a heartrate of the user. Also, a necklace for a chest strap may be an obstruction because it may slide between the chest strap and the chest of the user and prevent the monitor from determining the heartrate of the user. In addition, earrings for wireless headphones may be an obstruction because they may push the headphones away from the ear and limit the maximum volume and/or make wearing of the headphones uncomfortable.

According to one approach, a captured image may show that a skin condition exists that may affect performance of the wearable device, and the wearable device may be configured to account for the presence of the condition in any suitable way. In one approach, the user may be prompted to determine whether the user desires to have the wearable device take into consideration the skin condition prior to any action being taken by the wearable device to account for the presence of the condition in a suitable way. In one example, a tattoo may be positioned on skin of the user where a wearable device's sensors are located for reading a characteristic of the user, such as a temperature or heartrate. In this case, the wearable device may adjust sensor power to be stronger and/or adjust sensor thresholds to be lower in order to account for the presence of the tattoo, which may cause readings to be more difficult to obtain through the tattooed skin using the wearable device's sensor(s), such as a heartrate sensor, ECG sensor, temperature sensor, perspiration sensor, IR light sensor, etc.

According to an approach, an image may indicate characteristics of a user's body (e.g., vein appearance, skin thickness, wrinkles, skin coloration, age spots, scars, bruises, mole presence, amount of hair, etc. In response to detection of the user's characteristics, the display of the wearable device may be adjusted accordingly. In one approach, the user may be prompted to determine whether the user desires to have the wearable device take into consideration the perceived age of the user and/or to verify the perceived age of the user prior to any action being taken by the wearable device to account for the user's age.

In an example, based on a determination that a user is within a certain age range that may benefit from alterations to the wearable device, the wearable device may be configured for use by a person within an age range who may have trouble reading small print by enlarging the text size on a screen of the device and/or increasing a size of buttons displayed on a touchscreen of the device to allow for more imprecise touch inputs to still trigger a desired function or action. Further, the wearable device may have a volume for audio settings set louder, as many people have trouble hearing and louder volume settings may help the user to hear any audio alerts, instructions, directions, etc., produced by the wearable device.

In one example, based on a determination that a user is younger, the wearable device may be placed into a kid-friendly mode or a simple mode, that is configured to restrict some content availability to the user (complicated content may be restricted and/or age-appropriate content may only be provided). Further, the wearable device may be configured to operate with a simplified interface for the user to enable a younger user to more easily understand the functionality available.

In an example, the image may show that a sensor of the wearable device is not positioned in an optimal location or range of positions on the body of the user. In this case, the user may be alerted to adjust a position and/or orientation of the wearable device to position in which a sensor of the wearable device is better positioned to provide stronger readings taken from the body of the user. This alert may be produced audibly, visually, and/or haptically via the wearable device, the second electronic device, or some other suitable device.

In one example, a wearable device may comprise a glucose meter or sensor, and this glucose meter may operate better on the left wrist of the user. In response to the image indicating that the wearable device is positioned on the right wrist of the user, the user may be alerted to switch the wearable device to the left wrist in order to provide better glucose readings.

According to one approach, the image may show that the wearable device is oriented or positioned in a certain way (rotated relative to itself and/or moved relative to the user). By determining the orientation or position of the wearable device, features, interface(s), and/or feedback from the wearable device may be adjusted to account for the detected orientation or position. In one implementation, motion of the wearable device as a result of the user moving a body part may cause the wearable device to perform a function, e.g., wake, sleep, begin tracking activity, play media content, etc. In order for the wearable device to properly respond to the user's motion, the wearable device is configured to account for the position of the wearable device on the user based on analysis of the image such that movements of the wearable device result in predetermined features of the wearable device to be performed.

For example, a smartwatch may be worn on an inside or outside of a left or right wrist, which may be determined from the image. In response to detection that a smartwatch is being worn on an inside of a right wrist, motion of the user's hand upward with the smartwatch in this orientation would be reversed from motion of the user's hand upward with the smartwatch being worn on the outside of the right wrist. Therefore, the smartwatch is configured to account for how motion is perceived and is based on the location of the smartwatch on the body of the user, and orientation of the smartwatch relative to itself, that is determined from analysis of the image.

According to one approach, for a wearable device that includes a display, the orientation of a user interface (UI) provided on the display may be adjusted based on a position and/or orientation of the wearable device on the body of the user. For example, for a smartwatch, the orientation of the UI will be reversed (flipped upside down 180°) for a smartwatch being worn on the left hand versus on the right hand, when the body of the smartwatch is oriented to have the same side of the smartwatch be closer to the hand. Similarly, the orientation of the UI is reversed for a smartwatch being worn on the inside of the wrist versus the outside of the wrist, given that the same side of the smartwatch is closest to the hand. These UI orientations may be configured on the wearable device based on the analysis of the image to determine the position and/or orientation of the wearable device with respect to the body of the user.

The wearable device may have different features associated with different movements of the wearable device, and therefore determining how the wearable device is positioned on the body of the user is helpful for configuration of the wearable device. For a case where the wearable device is worn on a user's wrist, and upward movement wakes the device up for ease of use (so that the user does not have to manually wake the device up to use it), while the wrist and hand being in a lowered position puts the device to sleep to conserve battery, which hand and on which side of the wrist the wearable device is coupled to the user is stored as configuration information that is used to configure the wearable device to understand which movement causes the device to wake, and which movement causes the device to sleep.

In all of the above described processes and procedures, the data that is collected by the wearable device is stored on the wearable device, and is not uploaded to a server or device that aggregates such information. Moreover, any data that is transferred from the wearable device to the second electronic device is stored on the second electronic device and not uploaded to a server or aggregation device. Moreover, any data obtained by the second electronic device, such as images of the wearable device, or not shared with any other device.

FIG. 5 is flow diagram of an example method 500 for utilizing images captured for a paring process. For example, method 500 may be performed by a wearable device 114, a second electronic device 102, a configuration server 124, or some combination thereof, as described in FIG. 1. Moreover, in the descriptions of FIG. 5, method 500 may be performed by a wearable device to perform a pairing process with a second electronic device.

In step 502, a paring process is started by the wearable device to pair with a second electronic device, such as a smartphone, tablet computing device, laptop computing device, notebook computing device, media device, etc. The wearable device may be any type of wearable or portable electronic device known in the art, such as a smartwatch, an electronic wristband, a GPS device, AR/VR glasses or goggles, etc.

The pairing process may be configured to establish a secure communication channel between the wearable device and the second electronic device using any known wireless communication technology, such as Bluetooth, RF, IR, Wi-Fi, Wi-Max, etc.

Details of the full extent of the pairing process are omitted here, but may be performed in accordance with other known pairing processes, with the caveat that configuration information used in the pairing process and/or for configuration of the wearable device after the pairing process may be determined from images collected of the wearable device, as described herein in various implementations.

In step 504, an image that corresponds to the wearable device is received by the device which is performing method 500. The image may be a picture, one of several images received, a frame of a video, etc., and may correspond to the wearable device by including a representation of the wearable device and/or surroundings of the wearable device in relation to a user of the wearable device, as described herein.

In step 506, the image is analyzed to determine aspect(s) of the wearable device. The analysis may be performed in accordance with any known techniques for image and/or video analysis as described herein and/or as known in the art.

The aspect(s) may include, but are not limited to, a manufacturer and model of the wearable device, a size of the wearable device, a tightness of a band of the wearable device on a body part of a user, a material of the wearable device, a material of the band of the wearable device, a color of the wearable device, a color of the band of the wearable device, a physical orientation of the wearable device with respect to a body part of the user on which the wearable device is coupled to the user, an orientation of a physical input element of the wearable device with respect to a body of the wearable device, etc.

In step 508, the pairing process is completed between the wearable device and the second electronic device using the aspect(s) in any capacity that they are helpful in the pairing process.

For example, the model of the wearable device may be used in the pairing process to access instructions that are specific to that particular model of wearable device and use those specific instructions to complete the pairing process without requiring input from the user to specify the wearable device's model.

In an example, a shape, size, type, color and/or material of the wearable device, a band thereof, or any other physical aspect of the wearable device may be used to visually represent the wearable device on a display of the second electronic device. In this example, the user may select the visual representation of the wearable device prior to utilizing the wearable device in conjunction with the second electronic device, in a fashion that is easier than remembering a unique identifier of the wearable device, name, etc., that are displayed in a list.

FIG. 6 is flow diagram of an example method 600 for utilizing images captured for a configuration process. For example, method 600 may be performed by a wearable device 114, a second electronic device 102, a configuration server 124, or some combination thereof, as described in FIG. 1.

Referring again to FIG. 6, in step 602, an image that corresponds with a wearable device is received. In one implementation, several images and/or a video that corresponds with the wearable device may be received. In one approach, the image(s) may be captured by the second electronic device using a camera and/or video recorder thereof. The second electronic device may be any type of device known in the art, such as a smartphone, tablet computing device, laptop computing device, notebook computing device, media device, etc. The wearable device may be any type of wearable or portable electronic device known in the art, such as a smartwatch, an electronic wristband, a GPS device, AR/VR glasses or goggles, etc.

The images may be pictures, video, etc., and may correspond to the wearable device by including images of the wearable device and/or surroundings of the wearable device in relation to a user of the wearable device, as described herein.

In step 604, the images are analyzed to determine aspect(s) of the wearable device. The analysis may be performed in accordance with any known techniques for image and/or video analysis as described herein and/or as known in the art.

The aspect(s) may include, but are not limited to, a manufacturer and model of the wearable device, a size of the wearable device, a tightness of a band of the wearable device on a body part of a user, a material of the wearable device, a material of the band of the wearable device, a color of the wearable device, a color of the band of the wearable device, a physical orientation of the wearable device with respect to a body part of the user on which the wearable device is coupled to the user, an orientation of a physical input element of the wearable device with respect to a body of the wearable device, etc.

In step 606, the aspect(s) are used to configure the wearable device. The configuration of the wearable device may be performed in accordance with any known configuration scheme or method, with the caveat that some details about the wearable device that may typically be input by a user are instead provided by the analysis of the image(s), such as an orientation of the wearable device with respect to the user, an orientation of physical input elements of the wearable device with respect to the body of the wearable device, a model of the wearable device, a network and/or MAC address of the wearable device, etc.

Graphical User Interfaces

This disclosure above describes various Graphical User Interfaces (GUIs) for implementing various features, processes or workflows. These GUIs may be presented on a variety of electronic devices including, but not limited to, laptop computers, notebook computers, desktop computers, computer terminals, television systems, tablet computers, home media and entertainment devices, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from specific and legitimate sources to provide enhanced features in a pairing process. The present disclosure contemplates that in some instances, this gathered data may include personal information data that uniquely identifies or can be used to identify a specific person. Such personal information data can include demographic data, location-based data, online identifiers, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to configure a wearable device in a more user friendly manner than is currently possible. Accordingly, use of such personal information data enables users to enjoy benefits of the wearable device without undergoing a rigorous pairing process and subsequent configuration process. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy policies and practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate and reasonable uses of the entity and not shared or sold outside of those legitimate uses only. Further, such collection/sharing should occur only after receiving the informed consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a pairing process for a wearable device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at a city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the pairing process.

Example System Architecture

Figure 7:
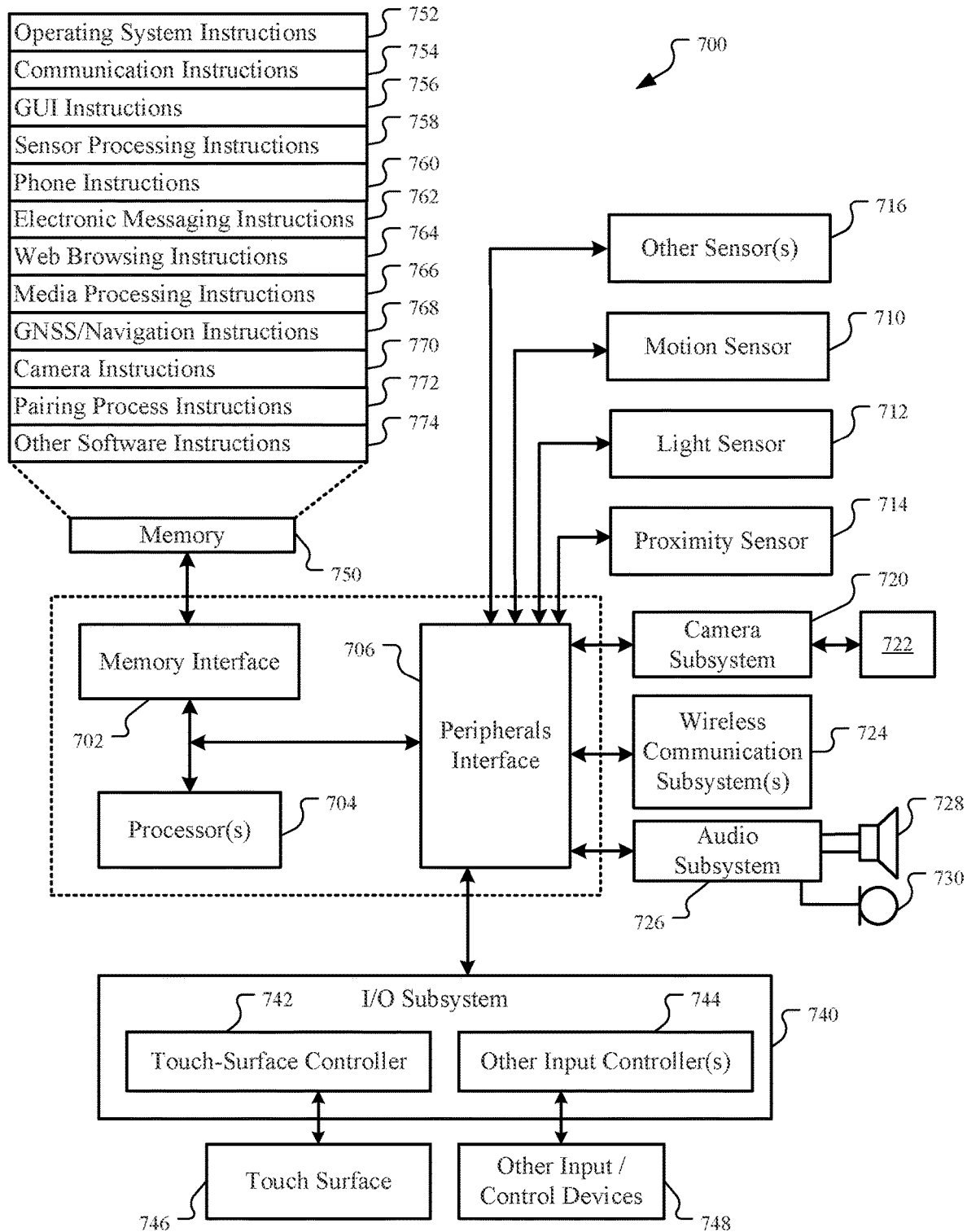
FIG. 7 is a block diagram of an example computing device that is configured to implement features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of a digital audio, video, and/or media player.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the advanced pairing process features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the advanced pairing processes and functions using image capture as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
    displaying, by a wearable device on a display screen of the wearable device, at least one image corresponding to the wearable device, the at least one image conveying one or more aspects of the wearable device;
    wherein the one or more aspects comprise one or more of: a manufacturer or a model of the wearable device;
    wherein the at least one image, displayed by the wearable device, is obtained by a second electronic device using an image sensor;
    wherein the manufacturer or the model conveyed by the at least one image is used by the second electronic device to determine configuration information, for the manufacturer or the model conveyed by the at least one image displayed by the wearable device, for configuring the wearable device;
    receiving, by the wearable device from the second electronic device, the configuration information for configuring the wearable device; and
    configuring, by the wearable device, one or more settings of the wearable device using the configuration information.

2. The method as recited in claim 1, further comprising:
    prior to displaying the at least one image corresponding to the wearable device: starting, by the wearable device, a pairing process with the second electronic device.

3. The method as recited in claim 1, wherein the one or more aspects further comprise an orientation of a body of the wearable device in relation to a body part of a user of the wearable device.

4. The method as recited in claim 1, wherein the at least one image comprises a graphical code that indicates the one or more aspects of the wearable device.

5. The method of claim 4, wherein the graphical code is segmented into a plurality of discrete portions, wherein each respective portion represents a respective aspect of the wearable device.

6. The method as recited in claim 1, wherein the at least one image comprises a graphical code that identifies the wearable device.

7. The method as recited in claim 1, wherein the configuration information for configuring the wearable device is determined based on a first image of the wearable device positioned on a body part of a user of the wearable device.

8. The method as recited in claim 1, wherein the at least one image comprises a graphical code configured to: (a) indicate the one or more aspects of the wearable device, and (b) identify the wearable device.

9. The method as recited in claim 1, wherein the second electronic device determining the at least one or more aspects of the wearable device based on the at least one image comprises:
    analyzing the at least one image to detect a graphical code that indicates the one or more aspects of the wearable device.

10. The method of claim 9, wherein the graphical code is segmented into first, second, third, and fourth portions, wherein:
    the first portion represents at least one aspect of a user of the wearable device;
    the second portion represents at least one aspect of the wearable device;
    the third portion represents an orientation of the wearable device relative to the user; and
    the fourth portion represents identifying information for one or more devices.

11. The method of claim 1, wherein the at least one image is used by a second electronic device to determine configuration information for configuring the wearable device at least by (a) determining at least one or more aspects of the wearable device based on the image and (b) determining the configuration information based on the one or more aspects of the wearable device.

12. The method of claim 1, wherein the wearable device is caused to display the at least one image in response to a triggering event comprising a user request for configuration of the wearable device.

13. The method of claim 1, wherein the operations further comprise:
    prior to displaying the at least one image: receiving, by the wearable device, the at least one image from a configuration server that provides a remote configuration service for the wearable device.

14. A non-transitory computer-readable medium including one or more sequences of instructions that, when executed by one or more processors, cause the one or more processors to perform operations comprising:
    displaying, by a wearable device on a display screen of the wearable device, at least one image corresponding to the wearable device, the at least one image conveying one or more aspects of the wearable device;
wherein the one or more aspects comprise one or more of: a manufacturer or a model of the wearable device;
wherein the at least one image, displayed by the wearable device, is obtained by a second electronic device using an image sensor;
wherein the manufacturer or the model conveyed by the at least one image is used by the second electronic device to determine configuration information, for the manufacturer or the model conveyed by the at least one image displayed by the wearable device, for configuring the wearable device;
receiving, by the wearable device from the second electronic device, the configuration information for configuring the wearable device; and
configuring, by the wearable device, one or more settings of the wearable device using the configuration information.

15. The non-transitory computer-readable medium as recited in claim 14, wherein the operations further comprise:
prior to displaying the at least one image corresponding to the wearable device: starting, by the wearable device, a pairing process with the second electronic device.

16. The non-transitory computer-readable medium as recited in claim 14, wherein the one or more aspects further comprise an orientation of a body of the wearable device in relation to a body part of a user of the wearable device.

17. The non-transitory computer-readable medium as recited in claim 14, wherein the at least one image comprises a graphical code that indicates the one or more aspects of the wearable device.

18. The non-transitory computer-readable medium as recited in claim 14, wherein the at least one image comprises a graphical code that identifies the wearable device.

19. The non-transitory computer-readable medium as recited in claim 14, wherein the configuration information for configuring the wearable device is determined based on a first image of the wearable device positioned on a body part of a user of the wearable device.

20. The non-transitory computer-readable medium as recited in claim 14, wherein the at least one image comprises a graphical code configured to: (a) indicate the one or more aspects of the wearable device, and (b) identify the wearable device.

21. A wearable device, comprising:
one or more processors; and
a non-transitory computer-readable medium including one or more sequences of instructions that, when executed by the one or more processors, cause the one or more processors to perform operations comprising:
displaying, by a wearable device on a display screen of the wearable device, at least one image corresponding to the wearable device, the at least one image conveying one or more aspects of the wearable device;
wherein the one or more aspects comprise one or more of: a manufacturer or a model of the wearable device;
wherein the at least one image, displayed by the wearable device, is obtained by a second electronic device using an image sensor;
wherein the manufacturer or the model conveyed by the at least one image is used by the second electronic device to determine configuration information, for the manufacturer or the model conveyed by the at least one image displayed by the wearable device, for configuring the wearable device;
receiving, by the wearable device from the second electronic device, the configuration information for configuring the wearable device; and
configuring, by the wearable device, one or more settings of the wearable device using the configuration information.

22. The wearable device as recited in claim 21, wherein the operations further comprise:
prior to displaying the at least one image corresponding to the wearable device: starting, by the wearable device, a pairing process with the second electronic device.

23. The wearable device as recited in claim 21, wherein the one or more aspects further comprise an orientation of a body of the wearable device in relation to a body part of a user of the wearable device.

24. The wearable device as recited in claim 21, wherein the at least one image comprises a graphical code that indicates the one or more aspects of the wearable device.

25. The wearable device as recited in claim 21, wherein the at least one image comprises a graphical code that identifies the wearable device.

26. The wearable device as recited in claim 21, wherein the configuration information for configuring the wearable device is determined based on a first image of the wearable device positioned on a body part of a user of the wearable device.

* * * * *